United States Patent
Markovitz et al.

(10) Patent No.: US 10,491,691 B2
(45) Date of Patent: Nov. 26, 2019

(54) METHODS AND APPARATUS FOR OPTIMIZING SERVICE DISCOVERY

(71) Applicant: Gilat Satellite Networks Ltd., Petah Tikva (IL)

(72) Inventors: Oren Markovitz, Raanana (IL); Yoseph Hecht, Rehovot (IL)

(73) Assignee: Gilat Satellite Networks Ltd., Petah Tikva (IL)

( * ) Notice: Subject to any disclaimer, the term of this patent is extended or adjusted under 35 U.S.C. 154(b) by 0 days.

(21) Appl. No.: 15/440,407

(22) Filed: Feb. 23, 2017

(65) Prior Publication Data
US 2017/0264695 A1    Sep. 14, 2017

Related U.S. Application Data

(60) Provisional application No. 62/307,133, filed on Mar. 11, 2016.

(51) Int. Cl.
| | | |
|---|---|---|
| *H04L 12/46* | (2006.01) | |
| *H04L 29/08* | (2006.01) | |
| *H04L 12/721* | (2013.01) | |
| *H04L 12/741* | (2013.01) | |

(52) U.S. Cl.
CPC .......... *H04L 67/16* (2013.01); *H04L 12/4633* (2013.01); *H04L 45/26* (2013.01); *H04L 45/745* (2013.01)

(58) Field of Classification Search
CPC . H04L 12/18; H04L 12/2836; H04L 12/4633; H04L 29/12066; H04L 45/00; H04L 45/741; H04L 67/16; H04L 45/26
USPC ......... 370/328, 331, 401, 392; 709/219, 247
See application file for complete search history.

(56) References Cited

U.S. PATENT DOCUMENTS

| | | | | |
|---|---|---|---|---|
| 8,279,776 | B1 * | 10/2012 | Everson | H04L 61/2514 370/401 |
| 2009/0268668 | A1 * | 10/2009 | Tinnakornsrisuphap | H04L 45/741 370/328 |
| 2009/0292824 | A1 * | 11/2009 | Marashi | H04L 29/12066 709/247 |
| 2014/0136660 | A1 * | 5/2014 | Ghai | H04L 12/2836 709/219 |

* cited by examiner

*Primary Examiner* — Harun Chowdhury
(74) *Attorney, Agent, or Firm* — Banner & Witcoff, Ltd.

(57) ABSTRACT

A first computing device and a second computing device may both be located behind the same gateway. The first computing device and the second computing device may not be part of a same local area network. Accordingly, the first computing device and the second computing device may not be discoverable to each other via standard layer two discovery protocols. The first computing device may be a tunneled device and the second computing device may be a non-tunneled device. Accordingly, the first computing device and the second computing device may not be discoverable to each other via standard layer three discovery protocols. Described herein are systems and methods for performing IP packet manipulation to facilitate a local discovery session between the first computing device and the second computing device.

18 Claims, 11 Drawing Sheets

METHODS AND APPARATUS FOR OPTIMIZING SERVICE DISCOVERY

RELATED MATTERS

This application claims priority to U.S. Patent Application Ser. No. 62/307,133, filed on Mar. 11, 2016, and entitled "METHODS AND APPARATUS FOR OPTIMIZING SERVICE DISCOVERY," the disclosure of which is incorporated by reference herein in its entireties and made part hereof

FIELD

Aspects of the disclosure pertain to the field of data communication in general and to performing service discovery utilizing one or more data networks in particular.

BACKGROUND

The General Packet Radio Service (GPRS) supports data communication in cellular networks. In Third Generation (3G) and Long Term Evolution (LTE) cellular networks, data communication is exchanged using the GPRS Tunneling Protocol (GTP). The user data tunneling part of the GTP protocol (GTP-U) is used over interfaces between access points (base-stations) and core network entities in many types of cellular networks, including over IuB interfaces in Universal Mobile Telecommunication Systems (UMTS), IuH interfaces in 3G networks, and S1 interfaces in LTE networks.

Each access point in the cellular network may be connected to at least one user equipment device (e.g., a UE). A UE may utilize one or more elements in the cellular network to transmit packets to the Internet and to receive packets from the Internet. Data packet(s) may be transmitted from the UE to an access point. The access point may utilize a tunnel to transmit the data packet(s) to a core network device, which may forward the data packet(s) to the Internet. The tunnel between the access point and the core network device may include additional components. These additional components may each be connected to one or more computing devices. These computing devices may provide one or more services that are of use to the UE. However, as the UE and the computing devices are not connected over a local area network (e.g. a LAN), the UE may be unaware of both the additional computing devices and the services provided by the additional computing devices.

SUMMARY

The following presents a simplified summary in order to provide a basic understanding of some aspects of the disclosure. This summary is not an extensive overview of the disclosure. It is intended neither to identify key or critical elements of the disclosure nor to delineate the scope of the disclosure. The following summary merely presents some aspects of the disclosure in a simplified form as a prelude to the description below.

In accordance with aspects of the disclosure, a method for performing service discovery in a communication network may include receiving, by a first computing device in the communication network, a Internet Protocol (IP) packet, transmitting, by the first computing device, the IP packet to a second computing device in the communication network, analyzing, by the second computing device, a destination address of the IP packet to determine whether the destination address of the IP packet is associated with a remote discovery server, modifying, by the second computing device and responsive to determining that the destination address of the IP packet is associated with a remote discovery server, the destination address of the IP packet to reference an IP address of a third computing device in the communication network, transmitting the IP packet to the Internet, receiving, by the third computing device and from the Internet, the IP packet, modifying, by the third computing device, a source address of the IP packet to reference an IP address of the third computing device, modifying, by the third computing device, the destination address of the IP packet to reference an IP address of the remote discovery server, and transmitting, by the third computing device, the IP packet to the remote discovery server. Aspects of the disclosure may further include encapsulating, by the first computing device, the IP packet prior to transmitting the IP packet to the second computing device.

The IP packet may be transmitted from the second computing device to the third computing device via a gateway device. Aspects of the disclosure may include receiving, by the second computing device, a second IP packet, analyzing, by the second computing device, a destination address of the second IP packet to determine whether the destination address of the second IP packet is associated with the remote discovery server, and responsive to determining that the destination address of the second IP packet is not associated with the remote discovery server, transmitting, by the second computing device, the second IP packet without modifying the second IP packet. Aspects of the disclosure may further include receiving, by the third computing device, a second IP packet, responsive to determining that a destination address of the second IP packet is referencing the remote discovery server, modifying the destination address of the second IP packet to reference the IP address of the third computing device, and transmitting the second IP packet to the remote discovery server.

Aspects of the disclosure may further include receiving, by the third computing device, a third IP packet from the remote discovery server, analyzing, by the third computing device, a port value assigned to the third IP packet to determine a destination device for the third IP packet, modifying, by the third computing device, a destination address of the third IP packet to reference an IP address of the destination device, and transmitting, by the third computing device, the third IP packet to the destination device. Aspects of the disclosure may further include receiving, by the third computing device, a fourth IP packet from the remote discovery server, analyzing, by the third computing device, a port value assigned to the fourth IP packet to determine a second destination device for the fourth IP packet, modifying, by the third computing device, a destination address of the fourth IP packet to reference an IP address of the second destination device, and transmitting, by the third computing device, the fourth IP packet to the second destination device.

Aspects of the disclosure may further include determining, by the remote discovery server, that the source address of the first IP packet is the same as the source address of the second IP packet, initiating, by the remote discovery server, a local discovery session between the destination device and the second destination device. In some embodiments, the first computing device may include an access point. In some embodiments, the first computing device comprises an evolved node B (enodeB).

BRIEF DESCRIPTION OF THE DRAWINGS

Figure 1:
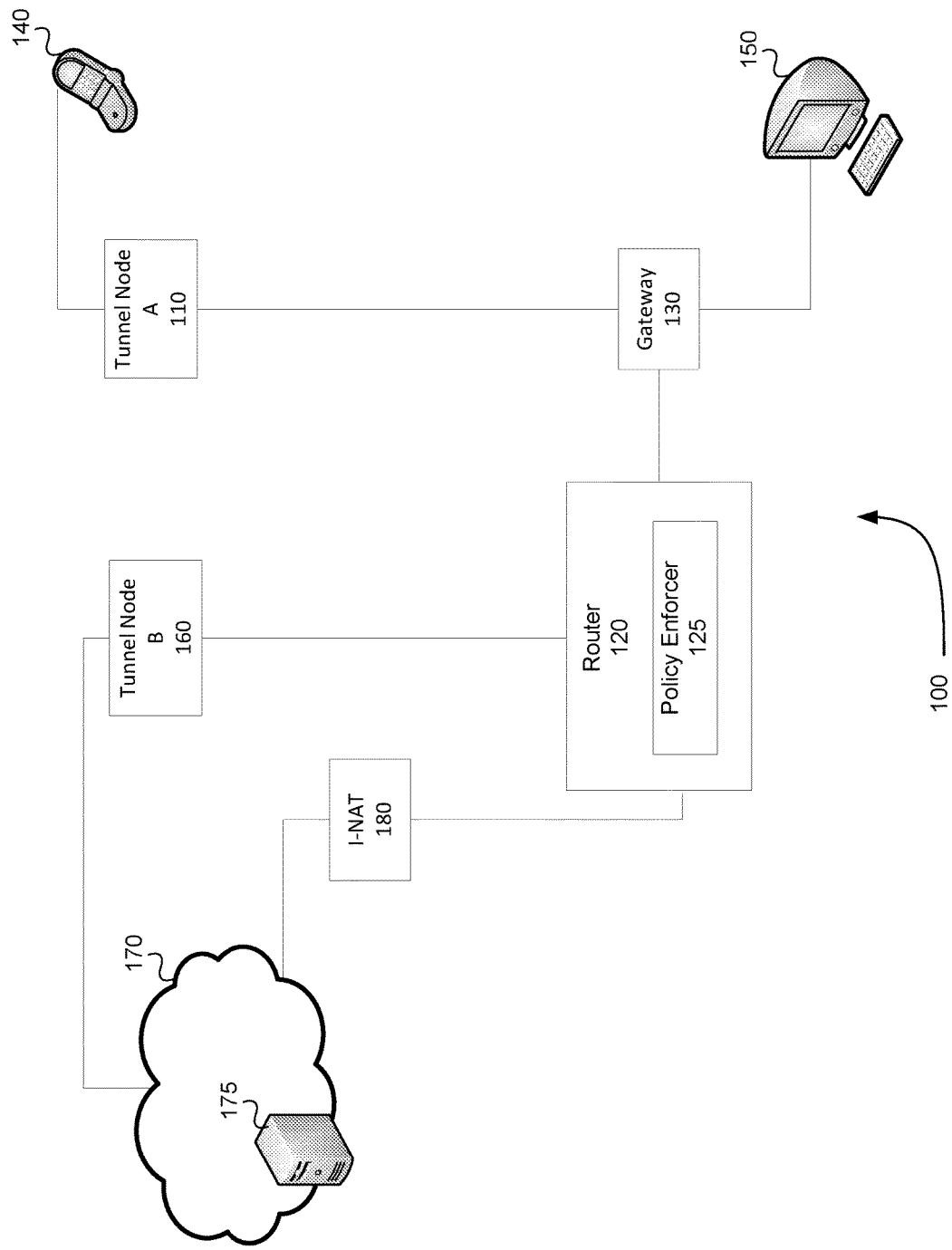
Figure 2:
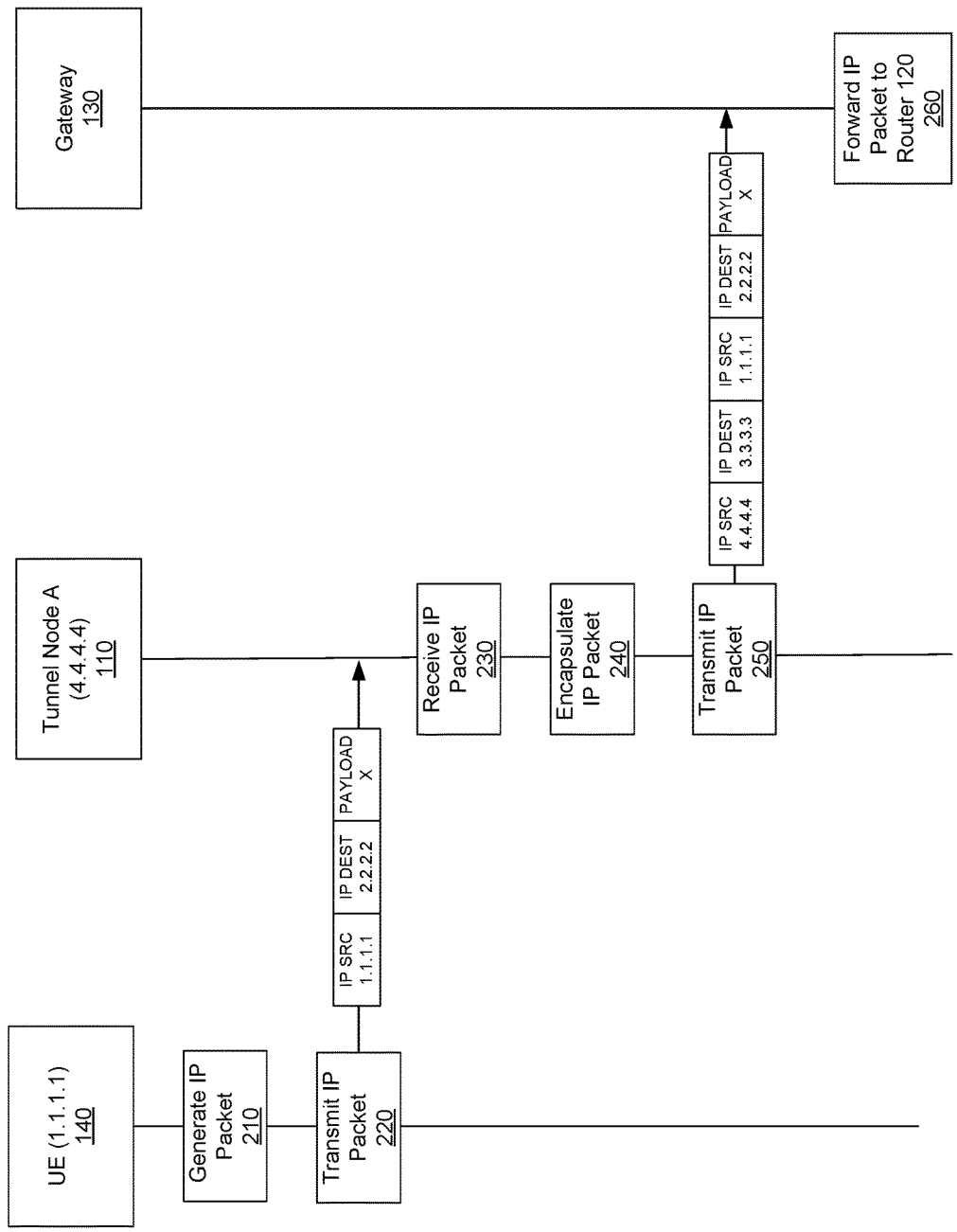
Figure 3:
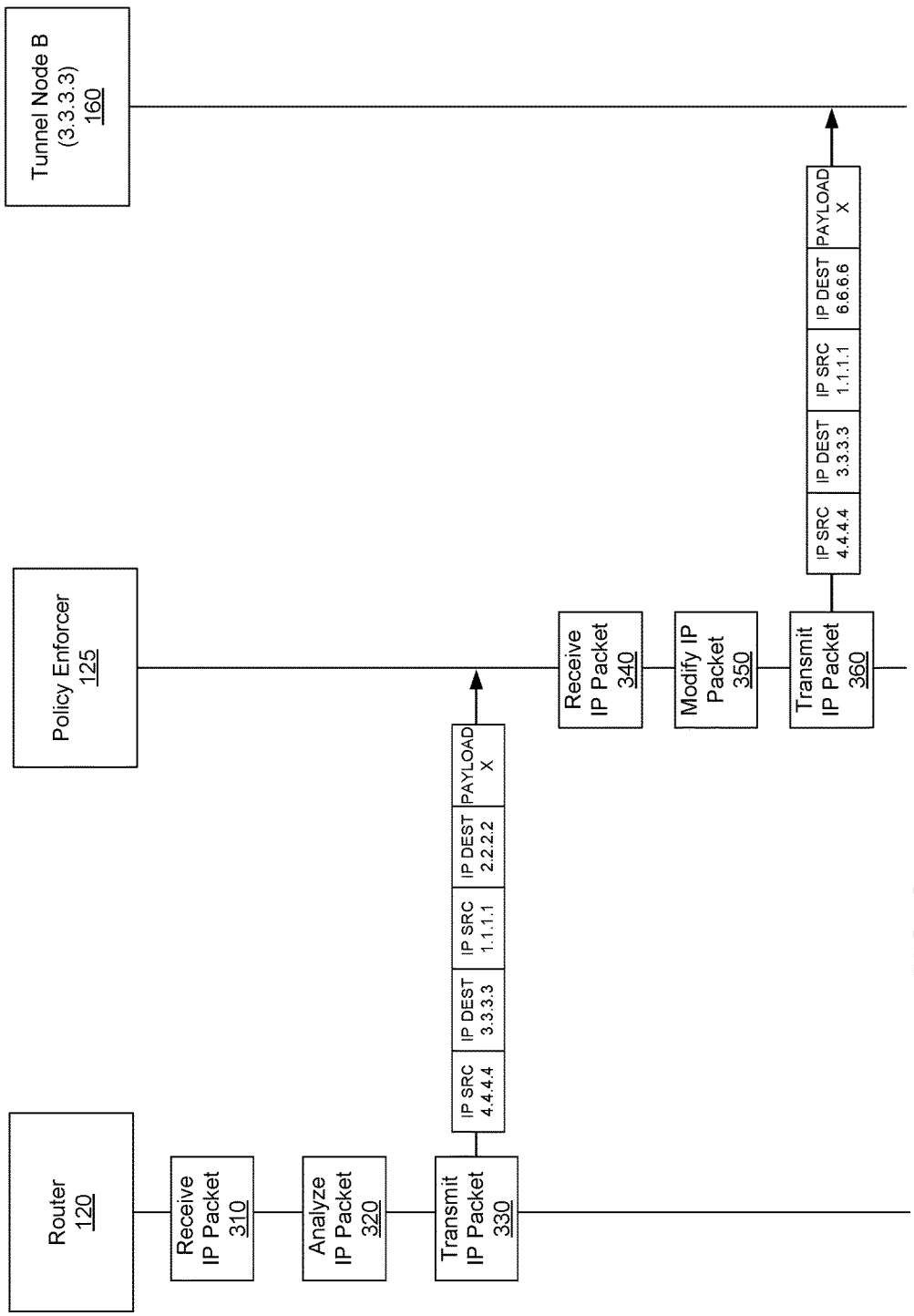
Figure 4:
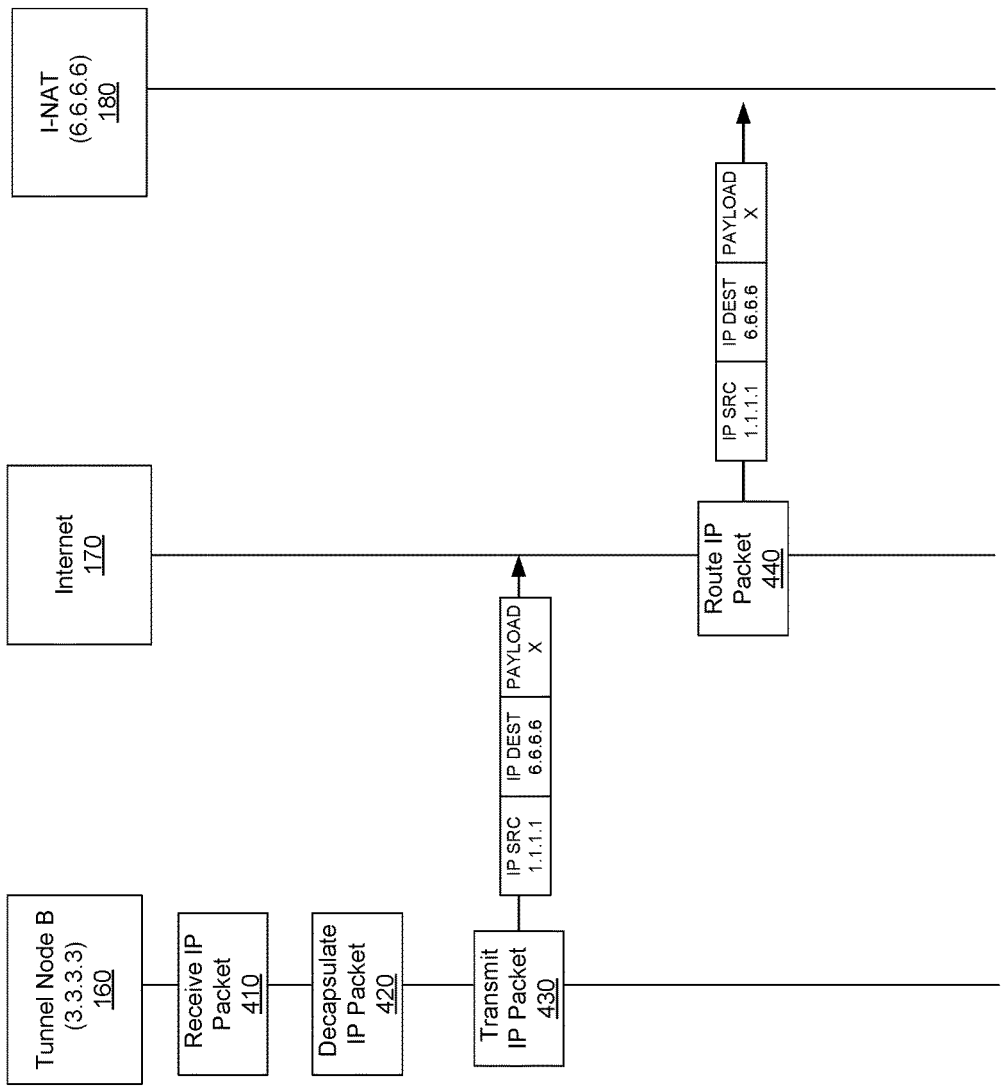
Figure 5:
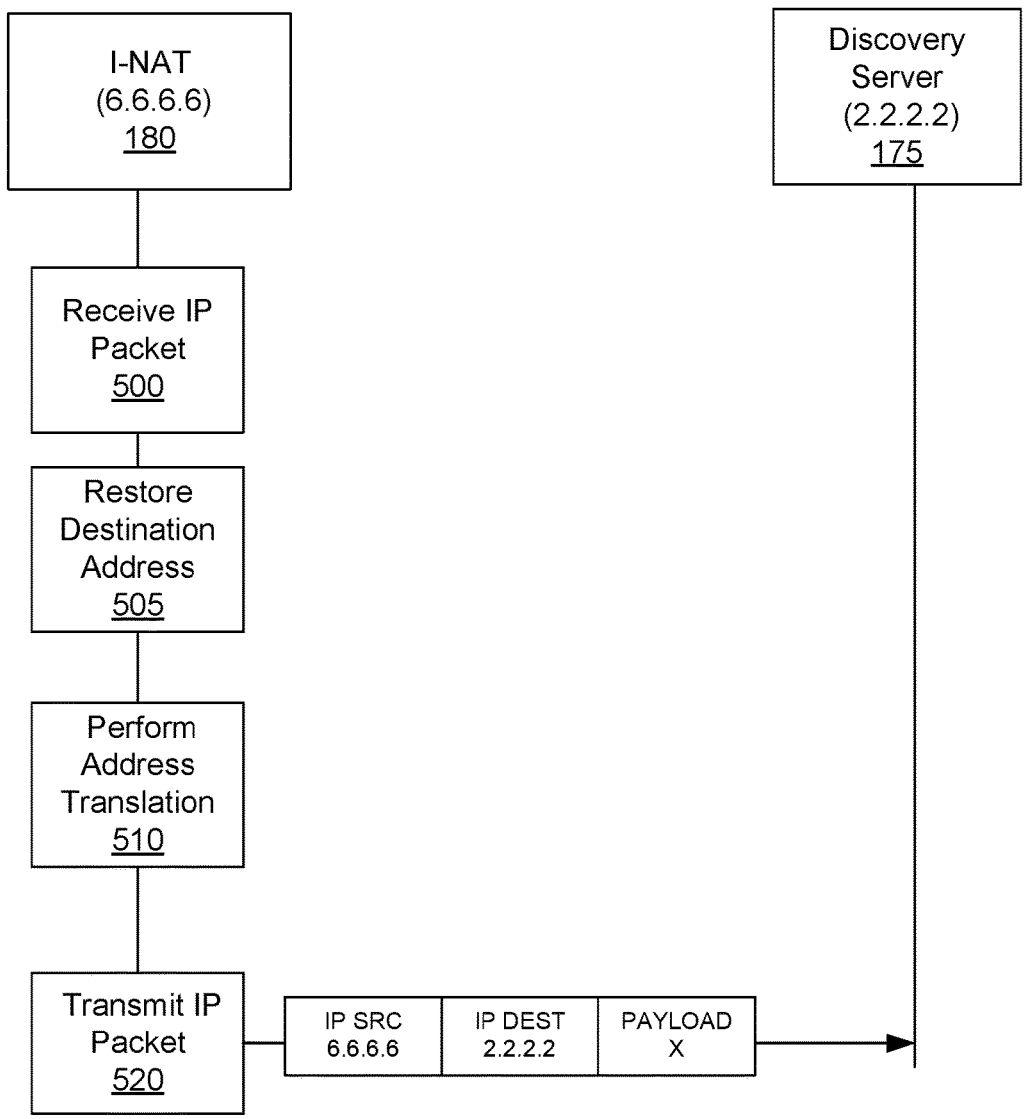
Figure 6:
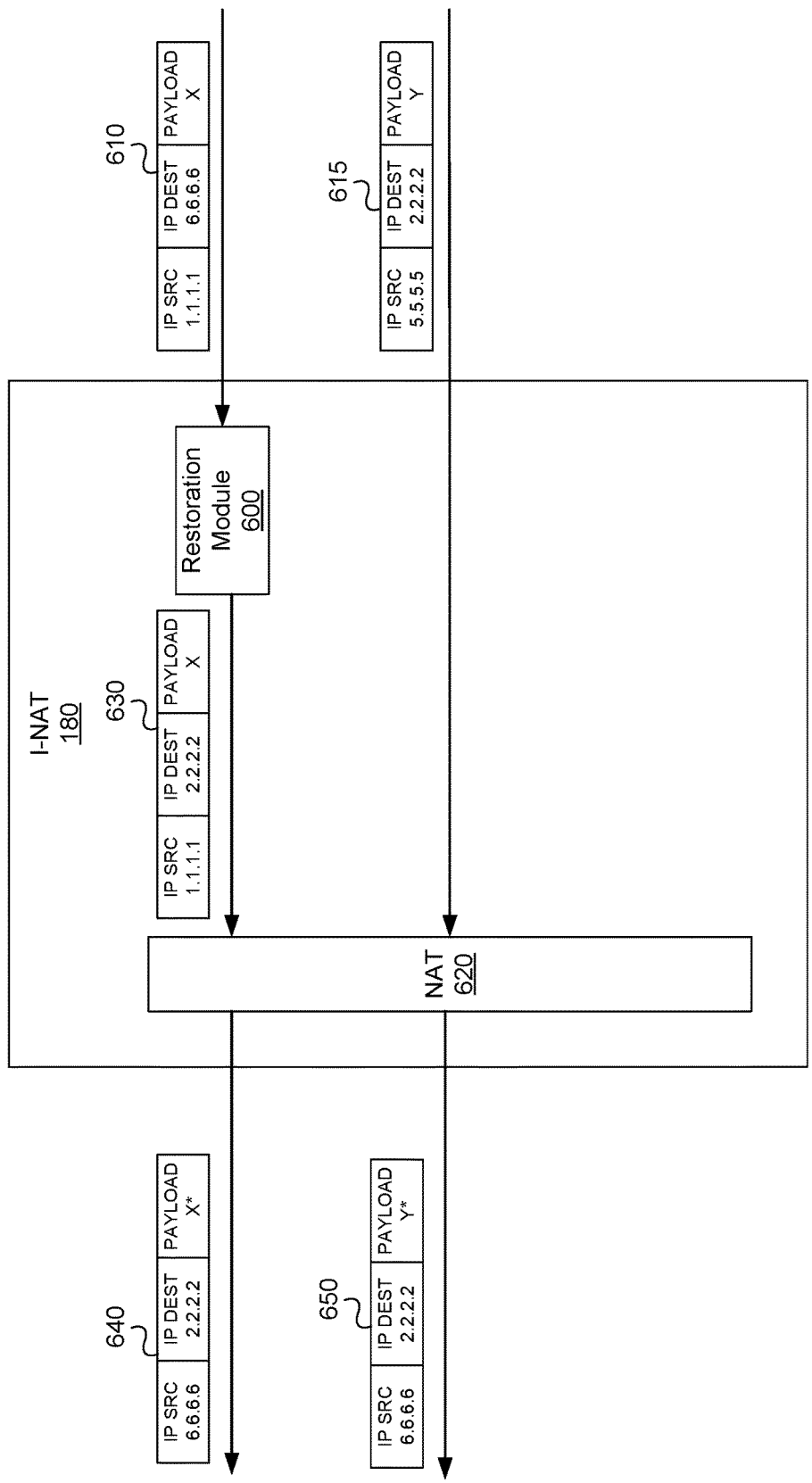
Figure 7:
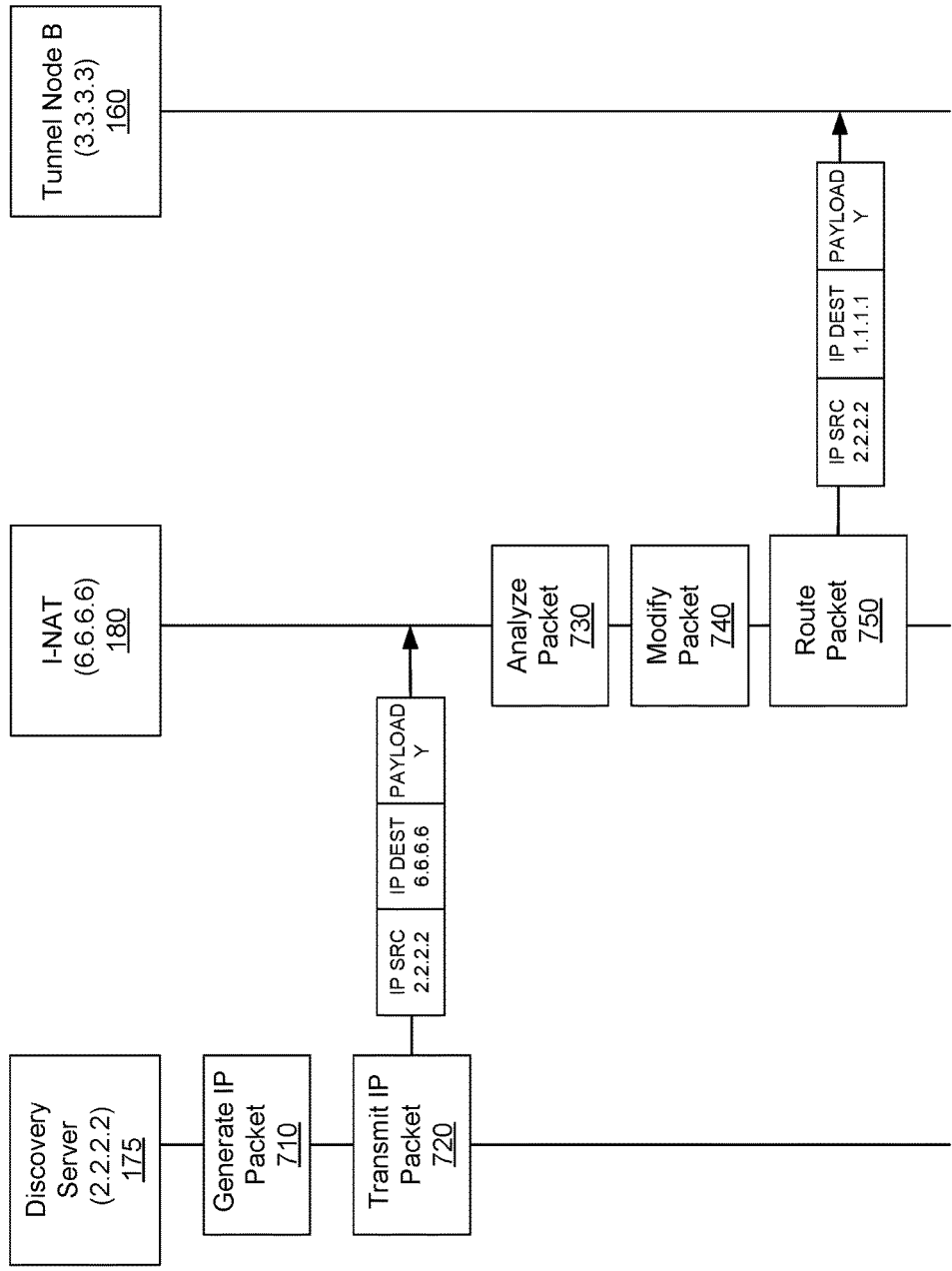
Figure 8:
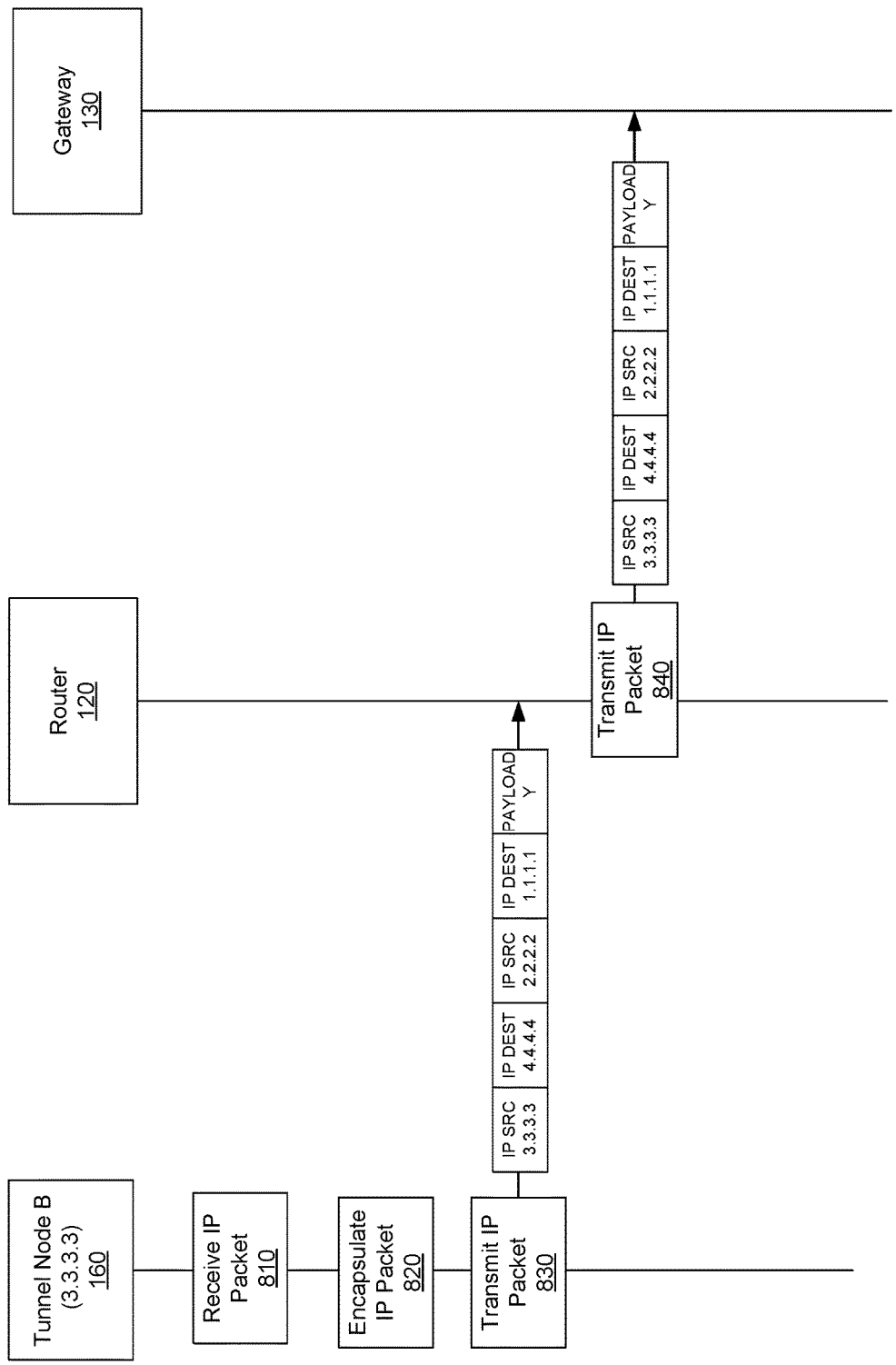
Figure 9:
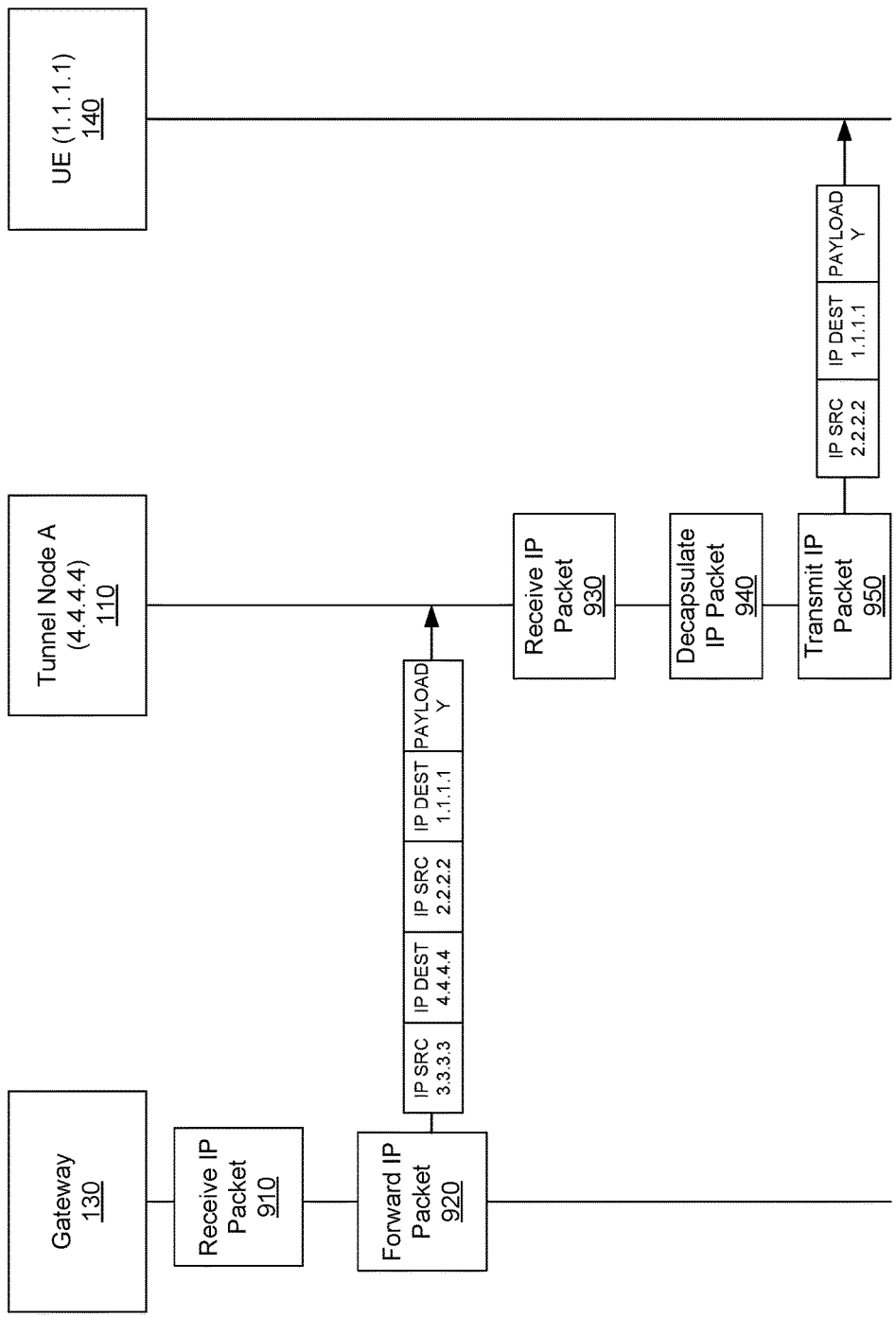
Figure 10:
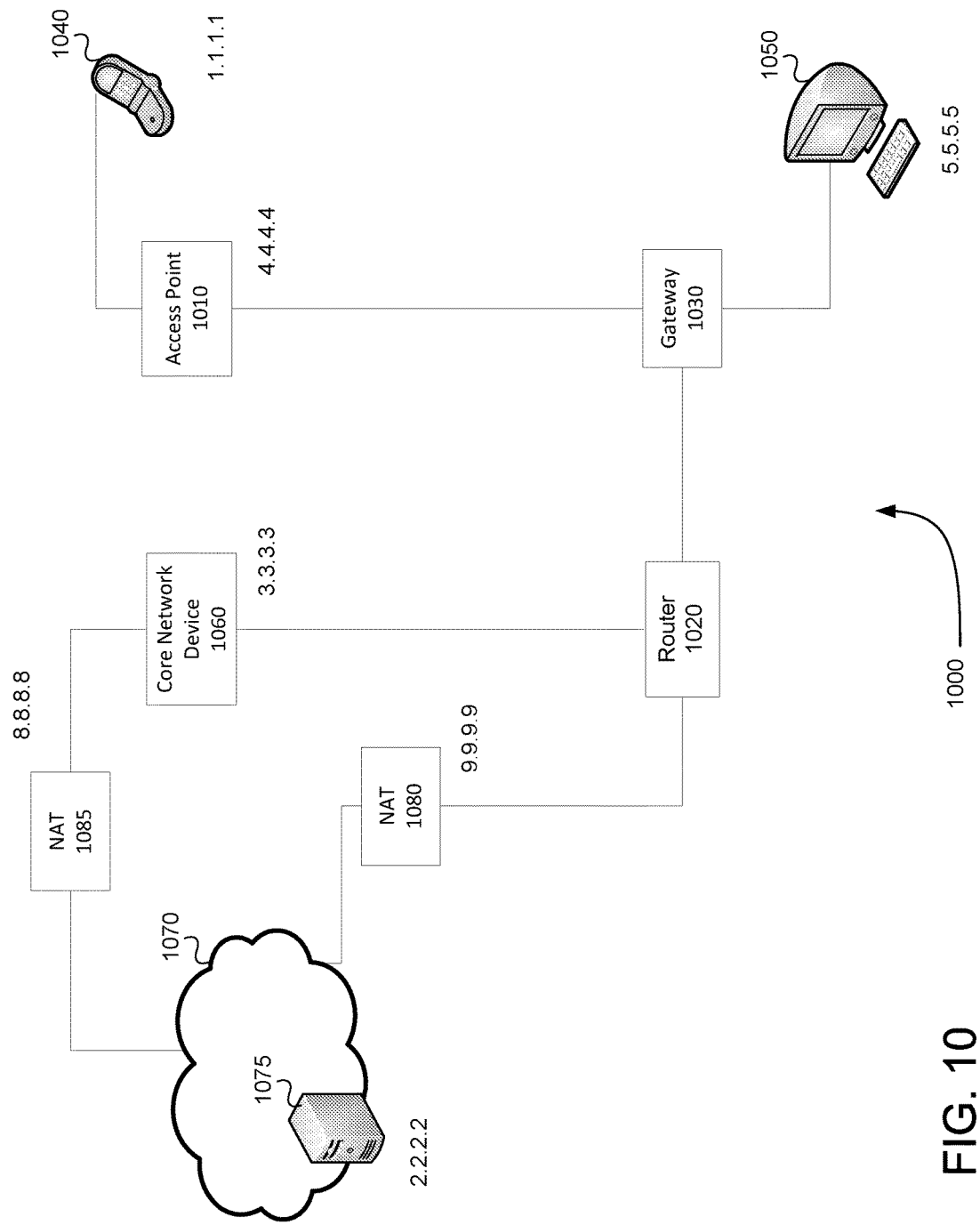
Figure 11:
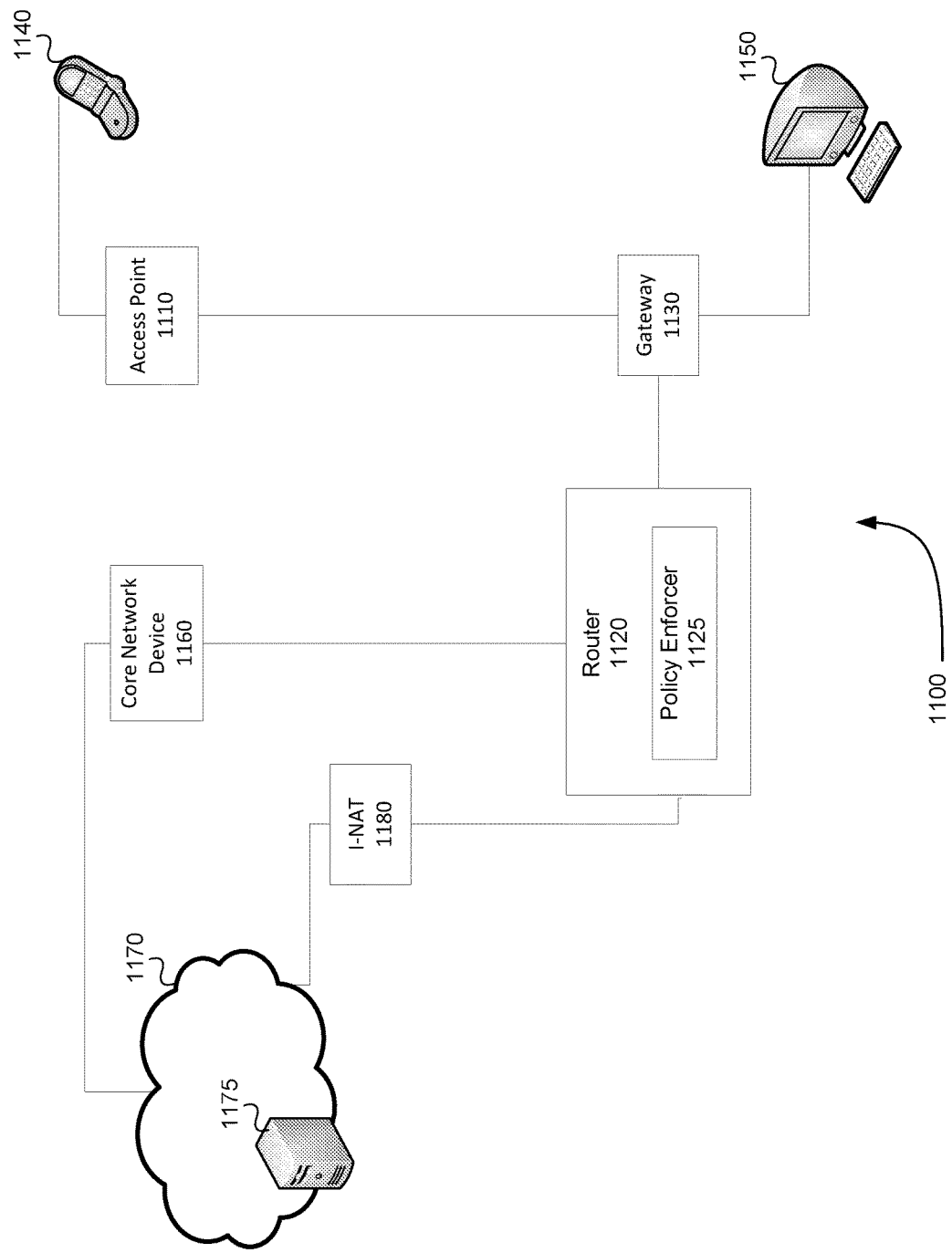

Having thus described the disclosure in general terms, reference will now be made to the accompanying drawings, which are not necessarily drawn to scale, and wherein:

FIG. 1 shows a communication system in accordance with aspects of the disclosure;

FIG. 2 depicts a first series of steps performed for uplink service discovery in accordance with one or more aspects described herein;

FIG. 3 depicts a second series of steps performed for uplink service discovery in accordance with one or more aspects described herein;

FIG. 4 depicts a third series of steps performed for uplink service discovery in accordance with one or more aspects described herein;

FIG. 5 depicts a fourth series of steps performed for uplink service discovery in accordance with one or more aspects described herein;

FIG. 6 depicts a block diagram illustrating an I-NAT device that may utilized during uplink and downlink service discovery;

FIG. 7 depicts a first series of steps performed for downlink service discovery in accordance with one or more aspects described herein;

FIG. 8 depicts a second series of steps performed for downlink service discovery in accordance with one or more aspects described herein;

FIG. 9 depicts a third series of steps performed for downlink service discovery in accordance with one or more aspects described herein;

FIG. 10 shows a communication system in accordance with aspects of the disclosure; and FIG. 11 shows a communication system in accordance with aspects of the disclosure.

DETAILED DESCRIPTION

Referring to FIG. 1, communication network 100 may include at least one

Tunnel Node A 110, at least one Tunnel Node B 160, and at least one user equipment device (UE) 140 connected to Tunnel Node A 110. Tunnel Node A 110 may be connected to Tunnel Node B 160 via a tunnel including at least gateway device 130 and router 120. Tunnel Node A 110 and Tunnel Node B 160 may represent entry and exit points for IP packets being tunneled. Router 120 may include a policy enforcer device 125 (discussed below in reference to FIG. 3). Tunnel Node B 160 may be connected to Internet 170. Remote discovery server 175 may further be connected to Internet 170. Remote discovery server 175 may perform discovery services locally for remote devices, and transmit locally-generated device information back to the remote devices. Router 120 may be connected to the Internet 170 via an Internet Protocol network address translation device (I-NAT) 180 (discussed below in reference to FIGS. 4-7). The depiction of one UE connected to Tunnel Node A 110 and one computing device connected to gateway device 130 is for illustrative purposes only, and additional UEs and/or computing devices may be present in communication network 100.

The at least one Tunnel Node A 110 and the at least one Tunnel Node B 160 may be configured to communicate, at least with each other, using one or more tunnels corresponding to the GPRS Tunneling Protocol (GTP). In some embodiments, said one or more tunnels may correspond to the data user part of the GTP (GTP-U). While the terms used in the above examples may be derived from specific cellular communication technologies (e.g., the 3rd Generation Partnership Project (3GPP), Long Term Evolution (LTE), etc.) communication network 100 may represent various other types of cellular communication networks, as well as other types of wireless communication networks. For example, Tunnel Node A 110 may be a base station or an enodeB, and Tunnel Node B 160 may be a core network device. The one or more tunnels may include at least at least gateway device 130 and router 120. The connection between gateway device 130 and router 120 may be implemented using backhauling technology including, but not limited to, fiber, microwave, satellite, and the like.

Gateway device 130 may be connected to at least one computing device 150. Gateway device 130 may offer one or more services that may be available to UE 140. For example, gateway device 130 may offer one or more of video applications, caching, application hosting, navigation applications, or the like. Although UE 140 and computing device 150 are both behind gateway device 130, UE 140 and computing device 150 are not connected to each other via a LAN. Accordingly, UE 140 may be unaware of the existence of computing device 150, and computing device 150 may similarly be unaware of UE 140. Additionally, UE 140 may not discover computing device 150 utilizing common layer two discovery protocols, such as link layer discovery protocol. Accordingly, a layer three discovery protocol may be used. As UE 140 is a tunneled device (i.e. UE 140 may access Internet 170 through a tunnel including at least Tunnel Node A 110, gateway device 130, router 120, and Tunnel Node B 160) and computing device 150 is not a tunneled device (i.e. computing device 150 accesses the Internet directly via gateway device 130 and router 120), I-NAT 180 may be utilized during service discovery (discussed below in reference to FIGS. 2-9).

Each of UE 140, computing device 150, Tunnel Node A 110, Tunnel Node B 160, I-NAT 180, and remote discovery server 175 may be network layer devices. That is, each of these devices may be assigned a unique IP address. For example only, and for purposes of this disclosure, the devices shown in FIG. 1 may be assigned IP address as follows:

| Device | Unique IP Address |
| --- | --- |
| UE 140 | 1.1.1.1 |
| remote discovery server 175 | 2.2.2.2 |
| Tunnel Node A 110 | 3.3.3.3 |
| Tunnel Node B 160 | 4.4.4.4 |
| computing device 150 | 5.5.5.5 |
| I-NAT 180 | 6.6.6.6 |

As noted above, UE 140 and computing device 150 may both be behind gateway device 130. However, UE 140 and computing device 150 may not share a LAN, thus making service discovery via layer two protocols infeasible. Thus, UE 140 and computing device 150 have to rely on NAT-based layer three ("L3") service discovery protocols. NAT-based L3 service discovery protocols rely on the fact that even if two devices do not share a LAN, they share a gateway that performs network address translation before sending the packets to the Internet (and thus, to a remote discovery server). That is, NAT-based L3 service discovery protocols assume that a first IP data packet received by a remote discovery server from a first device via a first gateway and a second IP data packet received by the remote discovery server from a second device via the first gateway will have the same source address in the IP header fields. Accordingly, the remote discovery server will determine, based on the identical source values, that the first device and the second device are both behind the first gateway. The remote discovery server may then configure a local service discovery session between the first device and the second device.

However, in the communication network 100 shown in FIG. 1, UE 140 is a tunneled device (i.e. IP packets from UE 140 are tunneled to the Internet via Tunnel Node A 110 and Tunnel Node B 160), while computing device 150 is a non-tunneled device (i.e. IP packets from computing device 150 are transmitted directly to the Internet without any tunneling). Restrictions imposed by internet service providers may prevent the placement of a NAT device between Tunnel Node B 160 and Internet 170. Accordingly, IP packets from UE 140 to remote discovery server 175 and from computing device 150 to remote discovery server 175 may not have the same source address in the IP headers.

Accordingly, the series of steps shown in FIGS. 2-5 may be performed during uplink service discovery. Referring to FIG. 2, a first series of steps performed during uplink service discovery are illustrated. At step 210, UE 140 may generate an IP data packet related to performing service discovery. UE 140 may be a mobile device, such as a cellular device. The IP data packet may include an IP header field indicating the source of the data packet ("the IP SRC"), an IP header field including the destination of the IP data packet ("the IP DEST"), and a payload field. Here, the IP SRC indicates a value of 1.1.1.1 (the IP address of UE 140) and the IP DEST indicates a value of 2.2.2.2 (the IP address of remote discovery server 175). The payload field may store any information related to service discovery. For example, the payload field may store a request for a list of services that are available to UE 140.

At step 220, UE 140 may transmit the IP packet to Tunnel Node A 110. Tunnel Node A 110 may be entry-point for all data packets that are tunneled from UE 140 to Internet 170. In one example, Tunnel Node A 110 may be an evolved Node B (i.e. enodeB or enB). At step 230, Tunnel Node A 110 may receive the IP data packet from UE 140. At step 240, Tunnel Node A 110 may encapsulate the IP data packet. That is, prior to tunneling the IP data packet received from UE 140, Tunnel Node A 110 may encapsulate the IP data packet inside an outer IP packet. The encapsulated packet may then be tunneled to Tunnel Node B 160. Computing devices in the tunnel that are used to forward or route the encapsulated IP packet may do so based on the contents of the outer IP packet. Alternatively, computing devices in the tunnel that are used to forward or route the encapsulated IP packet may do so based on the contents of the outer IP packet and the contents on the inner IP packet. The specifics of the encapsulation may vary depending on the type of communication network 100 that is implemented and depending on the configurations of the tunnel, Tunnel Node A 110, and Tunnel Node B 160.

At a minimum, encapsulation as performed by Tunnel Node A 110 may include specifying a source and destination within the IP header of the outer IP packet. In addition, Tunnel Node A 110 may encrypt all or parts of the IP packet received from UE 140. Here, Tunnel Node A 110 may specify the source field of the IP header of the outer IP packet to indicate Tunnel Node A 110 (i.e. an IP address of 4.4.4.4.) Tunnel Node A 110 may further specify the destination field of the IP header of the IP packet to indicate Tunnel Node B 160 (i.e. the exit point of the tunnel and an IP address of 3.3.3.3.) The contents of the inner IP packet (i.e. the packet received from UE 140), such as the source field and the destination field in the IP header and the payload, may remain unchanged (besides any encryption). Thus, the source address in the IP header of the inner IP packet indicates the address of UE 140 (1.1.1.1) and the destination address in the IP header of the inner IP packet indicates the address of remote discovery server 175 (i.e. 2.2.2.2.) At step 250, Tunnel Node A 110 may initiate tunneling of the encapsulated IP packet by forwarding the encapsulated IP packet to gateway device 130. At step 260, gateway device 130 may forward the encapsulated IP packet to router 120. Gateway device 130 may forward the encapsulated IP packet to router 120 without modifying the encapsulated IP packet.

Referring to FIG. 3, a second series of steps performed during uplink service discovery are illustrated. At step 310, router 120 may receive the encapsulated data packet from gateway device 130. At step 320, router 120 may analyze the contents of the encapsulated data packet. In one example, router 120 may analyze the value of the IP DEST in the inner IP packet to determine if the destination address of the inner IP packet is associated with a discovery server. Router 120 may maintain a list of IP addresses that are associated with remote discovery servers. Router 120 may cross-reference the destination address of the inner IP packet received in step 310 with the list of IP addresses. If router 120 determines that the destination address (IP DEST) of the inner IP packet is not associated with a discovery server, router 120 may forward the encapsulated data packet to Tunnel Node B 160 (not shown). If router 120 determines that the destination address of the inner IP packet is associated with a remote discovery server, router 120 may, at step 330, forward the encapsulated data packet to policy enforcer device 125. Here, router 120 may analyze the destination address of the inner IP packet and determine that the IP DEST value, 2.2.2.2, is associated with remote discovery server 175. Accordingly, at step 330, router 120 may forward the encapsulated IP packet to policy enforcer device 125.

Policy enforcer device 125 may be implemented internal to or external to router 120. The encapsulated packet transmitted from router 120 to policy enforcer device 125 may be the same as the packet received by router 120 from gateway device 130. That is, at step 330, router 120 may forward the encapsulated IP packet received at step 320 to policy enforcer device 125 without making any modifications to the IP packet. In this instance, the IP SRC of the outer IP packet has a value of 4.4.4.4 (i.e. the IP address of Tunnel Node A 110), the IP DEST of the outer IP packet has a value of 3.3.3.3 (i.e. the IP address of Tunnel Node B 160). Further in this instance, the IP SRC of the inner IP packet has a value of 1.1.1.1 (i.e. the IP address of UE 140), and the IP DEST of the inner IP packet has a value of 2.2.2.2 (i.e. the IP address of remote discovery server 175).

At step 340, policy enforcer device 125 may receive the encapsulated IP packet from router 120. At step 350, policy enforcer device 125 may modify the encapsulated IP packet. As noted above, internet service providers may prevent the placement of a NAT device between Tunnel Node B 160 and Internet 170. Accordingly, policy enforcer device 125 may be utilized to re-route all service discovery IP packets transmitted by UE 140 to I-NAT 180. That is, policy enforcer device 125 may modify all service discovery IP packets transmitted by UE 140 such that once these IP packets exit the tunnel (i.e. at Tunnel Node B 160) and are sent to the Internet, the IP packets are then returned to I-NAT 180 for appropriate network address translation. Policy enforcer device 125 may do this by modifying the inner IP packet of the encapsulated IP packet received at step 340. Specifically, policy enforcer device 125 may replace the destination address of the inner IP packet (the IP DEST field) with an IP address associated with I-NAT 180. Here, policy enforcer device 125 may replace the IP address of remote discovery server 175 (i.e. 2.2.2.2) currently stored in the IP DEST field of the inner IP packet with the IP address of I-NAT 180 (i.e. 6.6.6.6.) The remainder of the encapsulated IP packet may remain unchanged. At step 360, policy enforcer device 125 may transmit the modified encapsulated IP packet to the destination identified in the IP DEST field of the outer IP packet of the modified encapsulated IP packet (here, Tunnel Node B 160.) If policy enforcer device 125 is implemented within router 120, the modified encapsulated IP packet may be transmitted by router 120. The IP SRC of the outer IP packet of the modified encapsulated IP packet may indicate 4.4.4.4 (i.e. the IP address of Tunnel Node A 110) and the IP DEST of the outer IP packet of the modified encapsulated IP packet may indicate 3.3.3.3 (i.e. the IP address of Tunnel Node B 160). The IP SRC of the inner IP packet of the modified encapsulated IP packet may indicate 1.1.1.1 (i.e. the IP address of UE 140) and the IP DEST of the inner IP packet of the modified encapsulated IP packet may indicate 6.6.6.6 (i.e. the IP address of I-NAT 180).

Referring to FIG. 4, a third series of steps performed during uplink service discovery are illustrated. At step 410, Tunnel Node B 160 may receive the modified encapsulated IP packet from policy enforcer device 125 (or router 120). At step 420, Tunnel Node B 160 may decapsulate the received modified encapsulated IP packet. As noted above, Tunnel Node B 160 may represent the exit-point of the tunnel for IP packets that are tunneled from Tunnel Node A 110 to Tunnel Node B 160. This is illustrated by the IP DEST of the outer IP packet of the encapsulated IP packets transmitted from the UE 140 having a value of 3.3.3.3 (i.e. the IP address of Tunnel Node B 160). Accordingly, once the encapsulated IP packets reach the final destination of the tunnel (Tunnel Node B 160), the outer IP packet is no longer needed. Therefore, Tunnel Node B 160 may decapsulate the encapsulated IP packets may removing the outer IP packet from the encapsulated IP packet. Here, once Tunnel Node B 160 decapsulates the encapsulated IP packet received at step 410, the modified IP packet remains. That is, the IP SRC of the IP packet indicates a value of 1.1.1.1 (i.e. the UE 140). The IP DEST of the IP packet indicates a value of 6.6.6.6 as modified by policy enforcer device 125 at step 350 (i.e. the IP address of I-NAT 180). The payload of the IP packet remains unchanged (except for any encryption that Tunnel Node A 110 may have performed prior to tunneling the IP packet). At step 430, Tunnel Node B 160 may transmit the decapsulated IP packet to the Internet 170. The decapsulated IP packet may be transmitted to Internet 170 via one or more network elements, including, but not limited to, nodes, routers, gateways, servers, and the like. At step 440, the decapsulated IP packet may be routed based on the destination address of the decapsulated IP packet (IP DEST). Here, the decapsulated IP packet has a destination address of 6.6.6.6 and may accordingly be routed to I-NAT 180, which has an IP address of 6.6.6.6.

Referring to FIG. 5, a fourth series of steps performed during uplink service discovery are illustrated. At step 500, I-NAT 180 may receive the IP packet from the Internet 170 via one or more additional network devices. At step 510, I-NAT 180 may restore the destination IP address of the IP packet. As noted above, the IP packet originally transmitted by UE 140 to Tunnel Node A 110 had a destination address indicating remote discovery server 175 (i.e. 2.2.2.2). Policy enforcer device 125 then modified this destination address to reference the destination address of I-NAT 180 (i.e. 6.6.6.6), to ensure that all discovery data packets tunneled from UE 140 were routed to remote discovery server 175 via I-NAT 180. Accordingly, when I-NAT 180 receives the discovery-related IP packet at step 500, the IP SRC indicates the UE 140 (1.1.1.1), but the IP DEST references I-NAT 180 (6.6.6.6).

Therefore, at step 505, I-NAT 180 restores the destination address of the IP packet by determining the original destination of the received IP packet and modifying the header of the received IP packet to indicate the original destination. If the user equipment devices connected to Tunnel Node A 110 only access one remote discovery server (i.e. remote discovery server 175), then the IP address of remote discovery server 175 may be pre-stored in I-NAT 180. If the user equipment devices connected to Tunnel Node A 110 access more than one remote discovery server, one or more modifications may be made to the steps shown in FIGS. 2-4. In a first example, if router 120 determines, at step 320, that the IP packet received at step 310 is a service discovery packet, router 120 may modify the payload of the inner IP packet to include the original IP DEST. That is, router 120 may retrieve the value of the IP DEST field from the inner IP packet and store this information in the payload of the inner IP packet. Alternatively, policy enforcer device 125 may modify the payload of the inner IP packet to include the original IP DEST as part of the modification performed at step 350. Once I-NAT 180 has determined the original destination address of the IP packet (I-NAT 180 may retrieve the address from either the memory of I-NAT 180 or from the payload of the IP packet), I-NAT 180 may modify the destination address in the header of the IP packet. I-NAT 180 may replace the value of the IP DEST (currently indicating I-NAT 180) to instead reference the IP address of the remote discovery server (here, the IP address of remote discovery server 175, 2.2.2.2.)

At step 510, I-NAT 180 may perform network address translation on the IP packet. I-NAT 180 may replace the source address of the IP packet (currently indicating the IP address of the UE 140, 1.1.1.1) to instead reference I-NAT 180. The network address translation ensures that all future IP packets sent by remote discovery server 175 to UE 140 in response to the IP packet to be transmitted to the remote discovery server 175 are returned to I-NAT 180 (for reverse network address translation, discussed below in reference to FIGS. 6 and 7). Here, once I-NAT 180 has performed the above-described network address translation, the source address of the IP header of the IP packet references I-NAT 180 (with an IP address of 6.6.6.6), and the destination address of the IP header of the IP packet references remote discovery server 175 (with an IP address of 2.2.2.2). At step 520, I-NAT 180 may transmit the IP packet to remote discovery server 175.

FIG. 6 depicts a block diagram illustrating an I-NAT device 180 that may utilized during uplink and downlink service discovery. I-NAT 180 may include NAT device 620 and restoration module 600. Restoration module 600 may receive an IP packet 610 from a public interface, such as Internet 170. IP packet 610 may have initially transmitted by a user device, such as UE 140, to Tunnel Node A 110. IP packet 610 may have been routed via a tunnel to the Internet 170. Routing the packet through the tunnel may have included encapsulation, modification of the destination address of the inner IP packet of the encapsulated IP packet, and decapsulation. Accordingly, IP packet 610 may be similar to the IP packet received transmitted by the Internet 170 at step 430 (discussed above in reference to FIG. 4) and subsequently received by I-NAT 180 at step 500 (discussed above in reference to FIG. 5). That is, the source address of IP packet 610 may reference a user device connected to an Tunnel Node A, such as UE 140. The destination address of IP packet 610 may reference I-NAT 180 (i.e. 6.6.6.6). Restoration module 600 may restore the destination address in the IP header of IP packet 610 as described above in reference to step 505. That is, restoration module 600 may replace the destination address in the IP header of IP packet 610 with the IP address of remote discovery server 175 (i.e. 2.2.2.2), thereby generating IP packet 630.

I-NAT 180 may further receive IP packet 615. IP packet 615 may originate from computing device 150. That is, computing device 150 may have generated IP packet 615 and then transmitted IP packet 615 to gateway device 130. The source address of the IP header of IP packet 615 may reference computing device 150 (i.e. 5.5.5.5), and the destination address of the IP header of IP packet 615 may reference the IP address of remote discovery server 175 (i.e. 2.2.2.2). Gateway device 130 may have then forwarded IP packet 615 to router 120. Router 120 may have then forwarded IP packet 615 to I-NAT 180. Therefore, IP packet 615 may be transmitted from computing device 150 to I-NAT 180 via gateway device 130 and router 120. Unlike IP packets that originate from tunneled devices and that may be modified by router 120, router 120 may not modify IP packets received from non-tunneled devices, such as computing device 150. Accordingly, IP packet 615 may reach I-NAT 180 in its original form.

NAT device 620 may process both IP packet 615 and IP packet 630. NAT device 620 may include one or more computing devices configured to perform port and network address translation on incoming IP packets. NAT device 620 may perform similar network address translation on each of IP packet 615 and IP packet 630. That is, NAT device 620 may modify the source address of the IP headers of both IP packet 615 and IP packet 630 to reference I-NAT 180 (i.e. an IP address of 6.6.6.6). NAT device 620 may further modify the payload of each IP packet to include the original source addresses of the IP packets.

NAT device 620 may generate IP packet 640 as a result of performing network address translation on IP packet 630. IP packet 640 may be similar to the IP packet generated at step 510 (discussed above in reference to FIG. 5). The source address of the IP header of IP packet 640 may reference the IP address of I-NAT 180 (6.6.6.6). The destination address of the IP header of IP packet 640 may remain unchanged, and may reference of the IP address of remote discovery server 175 (i.e. 2.2.2.2.) The payload of IP packet 640 may include the source address included in the IP header of IP packet 630 (i.e. 2.2.2.2) in addition to the payload of IP packet 630. Similarly, NAT device 620 may generate IP packet 650 as a result of performing network address translation on IP packet 630. The source address of the IP header of IP packet 650 may reference the IP address of I-NAT 180 (6.6.6.6). The destination address of the IP header of IP packet 650 may remain unchanged, and may reference the IP address of remote discovery server 175 (i.e. 2.2.2.2.) The payload of IP packet 650 may include the source address included in the IP header of the IP packet (i.e. 5.5.5.5) in addition to the payload of IP packet 615.

I-NAT 180 may assign a unique port value to each of IP packet 640 and IP packet 650. That is, I-NAT 180 may assign a first port value to IP packet 640 and a second port value to IP packet 650. I-NAT 180 may then forward both IP packet 640 and IP packet 650 to remote discovery server 175. Remote discovery server 175 may determine that the source address in the IP header of both IP packet 640 and IP packet 650 references the same IP address. That is, remote discovery server 175 may determine that the source address in the IP header of IP packet 640 is 6.6.6.6 (i.e. the IP address of I-NAT 180) and that the source address in the IP header of IP packet 650 is also 6.6.6.6 (i.e. the IP address of I-NAT 180). Remote discovery server 175 may optionally analyze the source addresses in the payloads of both IP packet 640 and IP packet 650 to verify that the two packets originated from two different computing devices.

Based on the determination that the source addresses in the IP headers of both IP packet 640 and IP packet 650 reference the same IP address (and the optional determination that the source addresses in the payloads of IP packet 640 and IP packet 650 are different), remote discovery server 175 may determine that UE 140 and computing device 150 are behind the same gateway (i.e. gateway device 130). Remote discovery server 175 may then transmit a notification to each of UE 140 and computing device 150 informing each device of the presence of the other device. That is, remote discovery server 175 may transmit a notification (in the form of an IP packet) to UE 140 indicating that the computing device 150 is also behind gateway device 130. Remote discovery server 175 may further transmit a notification (in the form of an IP packet) to computing device 150 indicating the UE 140 is also behind gateway device 130. Additionally, remote discovery server 175 may configure a local discovery session between UE 140 and computing device 150. UE 140 may then perform local service discovery of computing device 150 using the local discovery session. UE 140 and computing device 150 may communicate by sending IP packets via Tunnel Node A 110 and gateway device 130.

I-NAT 180 may receive one or more IP packets from remote discovery server 175 in response to transmitting IP packet 640 and IP packet 650 to remote discovery server 175. I-NAT 180 may analyze the port value of the returned IP packets to determine if the IP packet is in response to IP packet 640 or IP packet 650. That is, I-NAT 180 may analyze the port value of the returned IP packets to determine if the IP packet is to be routed to UE 140 or computing device 150. If the returned IP packet is in response to IP packet 640, then I-NAT 180 must route the returned IP packet to UE 140. If the returned IP packet is in response to IP packet 650, then I-NAT 180 must route the returned IP packet to computing device 150. The routing of return IP packets to UE 140 is discussed below in reference to FIGS. 7-9. To route a returned IP packet to computing device 150, I-NAT 180 may modify the IP DEST field of the IP header of the returned packet. That is, when the IP packet is transmitted to I-NAT 180 in response to I-NAT 180's transmittal of IP packet 650, the destination address of the return IP packet references I-NAT 180 (i.e. an IP address of 6.6.6.6.) I-NAT 180 modifies the IP DEST field to instead reference computing device 150 (i.e. an IP address of 5.5.5.5). I-NAT 180 then forwards the modified return IP packet to router 120. Router 120 may forward the modified return IP packet to gateway device 130, which may then forward the modified return IP packet to computing device 150.

FIG. 7 depicts a first series of steps performed for downlink network address translation during service discovery. As discussed above in reference to FIG. 6, I-NAT 180 may receive one or more return packets from remote discovery server 175 in response to the IP packet 640 being transmitted from I-NAT 180 to remote discovery server 175. This return IP packet may be generated by remote discovery server 175 at step 710. The return packet may be related to the service discovery IP packet transmitted to remote discovery server 175 from UE 140. Therefore, the payload of the return IP packet may include information related to service discovery. At step 720, remote discovery server 175 may transmit the return IP packet to I-NAT 180. The source field in the IP header of return IP packet may reference the IP address of remote discovery server 175 (i.e. 2.2.2.2). The destination field in the IP header of the return IP packet may reference the IP address of I-NAT 180 (i.e. 6.6.6.6).

At step 730, I-NAT 180 may analyze the return IP packet. I-NAT 180 may analyze the return IP packet to determine the computing device that the return IP packet is intended for. As discussed above in reference to FIG. 6, I-NAT 180 may assign a unique port value to each IP packet prior to transmittal to remote discovery server 175. The unique port values may identify the original source of the IP packet. The return IP packets from remote discovery server 175 may similarly include these unique port values. Here, I-NAT 180 may analyze the unique port value of the return IP packet and determine that the return IP packet is to be transmitted to UE 140.

To route the returned IP packet to UE 140, I-NAT 180 may, at step 740, modify the IP DEST field of the IP header of the returned IP packet. That is, when the IP packet is transmitted to I-NAT 180 in response to I-NAT 180's transmittal of IP packet 640, the destination address of the return IP packet references I-NAT 180 (i.e. an IP address of 6.6.6.6.) I-NAT 180 modifies the IP DEST field to instead reference UE 140 (i.e. an IP address of 1.1.1.1.) The source address of the returned IP packet (2.2.2.2) may remain unchanged. As UE 140 is a tunneled device, the return IP packet must be tunneled back to UE 140. Accordingly, once the return IP packet has been appropriately modified, I-NAT 180 forwards the return IP packet to Tunnel Node B 160 at step 750.

FIG. 8 depicts a second series of steps performed for downlink network address translation during service discovery. At step 810, Tunnel Node B 160 may receive the return IP packet from I-NAT 180. At step 820, Tunnel Node B 160 may encapsulate the return IP packet in preparation for tunneling the return IP packet to Tunnel Node A 110. Tunnel Node B 160 may encapsulate the return IP packet within an outer IP packet. Tunnel Node B 160 may set the source address of the IP header of the outer IP packet to reference Tunnel Node B 160 (i.e. an IP address of 3.3.3.3). Tunnel Node B 160 may set the destination address of the IP header of the outer IP packet to reference Tunnel Node A 110 (i.e. an IP packet of 4.4.4.4). Here, Tunnel Node A 110 represents the exit-point of the return IP packet from the tunnel. The contents of the return IP packet, such as the source address and the destination address, may remain unmodified by Tunnel Node B 160. At step 830, Tunnel Node B 160 may transmit the encapsulated IP packet to router 120. At step 840, router 120 may forward the encapsulated IP packet to gateway device 130. Router 120 may forward the encapsulated IP packet to gateway device 130 without modifying the encapsulated IP packet.

FIG. 9 depicts a third series of steps performed for downlink network address translation during service discovery. At step 910, gateway device 130 may receive the encapsulated IP packet from router 120. At step 920, gateway device 130 may forward the encapsulated IP packet to Tunnel Node A 110. Gateway device 130 may forward the encapsulated IP packet to Tunnel Node A 110 without modifying the encapsulated IP packet. That is, the IP header of the outer IP packet may have a source address referencing Tunnel Node B 160 and a destination address referencing Tunnel Node A 110. Additionally, the IP header of the inner IP packet may have a source address referencing remote discovery server 175 and the IP header of the inner IP packet may have a destination address referencing UE 140. At step 930, Tunnel Node A 110 may receive the encapsulated IP packet from gateway device 130. At step 940, Tunnel Node A 110 may decapsulate the encapsulated IP packet received from gateway device 130. That is, Tunnel Node A 110 may remove the encapsulating IP packet (such as the outer IP header). Thus, the IP packet then mirrors the return IP packet transmitted from I-NAT 180 to Tunnel Node B 160 at step 740 (discussed above in reference to FIG. 7). That is, the IP packet comprises one IP source field (referencing the IP address of remote discovery server 175, 2.2.2.2) and one IP destination field (referencing the IP address of UE 140, 1.1.1.1). At step 950, Tunnel Node A 110 may forward the IP packet to UE 140.

FIG. 10 illustrates an alternative communication system 1000. UE 1040, computing device 1050, gateway device 1030, Tunnel Node A 1010, Tunnel Node B 1060, remote discovery server 1075, and Internet 1070 may correspond to UE 140, computing device 150, gateway device 130, Tunnel Node A 110, Tunnel Node B 160, remote discovery server 175, and Internet 170 from FIG. 1, respectively. Router 1020 may correspond to router 120, but may exclude policy enforcer device 125. NAT device 1080 and NAT device 1085 may each correspond to NAT device 620 as discussed above in reference to FIG. 6. That is, NAT device 1080 may perform network address translation on IP packets destined for remote discovery server 1075 by modifying the destination address of the IP packet to reference the IP address of NAT device 1080 (here, 9.9.9.9). NAT device 1080 may further perform reverse network address translation on IP packets returned from remote discovery server 1075 by modifying the destination address of the IP packet to reference the IP address of UE 1040 (here, 1.1.1.1.) NAT device 1085 may perform network address translation on IP packets destined for remote discovery server 1075 by modifying the destination address of the IP packet to reference the IP address of NAT device 1085 (here, 8.8.8.8). NAT device 1085 may further perform reverse network address translation on IP packets returned from remote discovery server 1075 by modifying the destination address of the IP packet to reference the IP address of computing device 150 (here, 5.5.5.5.)

The inclusion of NAT device 1085 results in the exclusion of I-NAT device 180. Therefore, uplink service discovery packets from UE 1040 may be processed as follows. A service discovery IP packet may be transmitted from UE 1040 to Tunnel Node A 1010. The source address of the service discovery IP packet may reference the IP address of UE 1040 (i.e. 1.1.1.1) and the destination address of the service discovery packet may reference the IP address of remote discovery server 1075 (i.e. 2.2.2.2). Tunnel Node A 1010 may encapsulate the service discovery IP packet in an outer IP packet as discussed above in reference to FIG. 2. The source address of the outer IP packet may reference the IP address of Tunnel Node A 110 (i.e. 4.4.4.4) and the destination address of the outer IP packet may reference the IP address of Tunnel Node B 1060 (i.e. 3.3.3.3). The contents of the inner IP packet may remain unmodified. Tunnel Node A 1010 may then forward the encapsulated IP packet to gateway device 1030. Gateway device 1030 may forward the encapsulated IP packet to router 1020. Router 1020 may forward the encapsulated IP packet to Tunnel Node B 1060. Router 1020 may forward the encapsulated IP packet to Tunnel Node B 1060 without modifying the encapsulated IP packet. Tunnel Node B 1060 may then decapsulate the encapsulated IP packet and forward the packet to NAT device 1080. Tunnel Node B 1060 may decapsulate the encapsulated IP packet by removing the outer IP packet (and thus, by removing the source address and the destination address in the IP header of the outer IP packet). Thus, the IP packet as forwarded from Tunnel Node B 1060 to NAT device 1085 has a source address referencing UE 140 (i.e. 1.1.1.1) and a destination address referencing remote discovery server 175 (i.e. 2.2.2.2).

NAT device 1085 may then perform network address translation on the IP packet. That is, NAT device 1085 may replace the source address of the IP packet (currently reference the IP address of UE 1040) with the IP address of NAT device 1085. Thus, once network address translation is complete, the source address in the IP header of the IP packet will reference the IP address of NAT device 1085 (i.e. 8.8.8.8) and the destinations address in the IP header of the IP packet will reference the IP address of remote discovery server 1075 (i.e. 2.2.2.2). NAT device 1085 may then route the packet to remote discovery server 175 via Internet 1070. IP packets generated by remote discovery server 1075 in response to IP packets transmitted by NAT device 1085 will be returned to NAT device 1085 (based on the source address of outgoing IP packets from NAT device 1085). The IP packet transmitted from remote discovery server 1075 to NAT device 1085 will have a source address referencing the IP address of remote discovery server 1075 and a destination address referencing the IP address of NAT device 1085. NAT device 1085 may then perform reverse network address translation on these packets. That is, NAT device 1085 may replace the destination address of the IP packets with the destination address of UE 1040. NAT device 1085 may then route the IP packets back to UE 1040 using the steps described above in reference to FIGS. 8 and 9.

Uplink service discovery packets from computing device 1050 may be processed differently than those from UE 140. Computing device 1050 may transmit an IP packet related to service discovery to gateway device 1030. Gateway device 1030 may forward the IP packet to router 1020 without modifying the IP packet. Router 1020 may forward the IP packet to NAT device 1080 without modifying the IP packet. The IP packet, as output be computing device 1050 and received by NAT device 1080 may include a source address in the IP header referencing computing device 150 (i.e. 5.5.5.5) and a destination address in the IP header referencing remote discovery server 1075 (i.e. 2.2.2.2.) NAT device 1080 may then perform network address translation on the IP packet by replacing the source address in the IP header of the IP packet with the address of NAT device 1080 (i.e. 9.9.9.9). Thus, once network address translation is complete, the source address in the IP header of the IP packet will reference the IP address of NAT device 1080 (9.9.9.9) and the destinations address in the IP header of the IP packet will reference the IP address of remote discovery server 1075 (i.e. 2.2.2.2).

NAT device 1080 may then route the IP packet to remote discovery server 175 via Internet 1070. IP packets generated by remote discovery server 175 in response to IP packets transmitted by NAT device 1080 will be returned to NAT device 1080 (based on the source address of outgoing IP packets from NAT device 1080). The IP packet transmitted from remote discovery server 175 to NAT device 1080 will have a source address referencing the IP address of remote discovery server 1075 and a destination address referencing the IP address of NAT device 1080. NAT device 1080 may then perform reverse network address translation on these packets. That is, NAT device 1080 may replace the destination address of the IP packets with the destination address of computing device 1050. NAT device 1080 may then route the IP packets back to computing device 150 via router 1020 and gateway device 1030.

FIG. 11 illustrates a communication system 1100. UE 1140, computing device 1150, gateway device 1130, router 1120, remote discovery server 1175, and Internet 1170 may correspond to UE 140, computing device 150, gateway device 130, router 120, remote discovery server 175, and Internet 170 from FIG. 1, respectively. In the configuration shown in FIG. 11, access point 1110 may correspond to Tunnel Node A 110. Alternatively, an evolved node B (enodeB) or base station may be used. Core network device 1160 corresponds to Tunnel Node B 160. That is, access point 1110 may perform all the functionalities of Tunnel Node A 110 as described above in reference to FIGS. 2-9, and core network device 1160 may perform all the functionalities of Tunnel Node B 160 as described above in reference to FIGS. 2-9.

In some embodiments, access point 1110 and core network device 1160 may be geographically separated and the tunnel used by access point 1110 and core network device 1160 may be carried over one or more high latency links, such as a satellite link. The satellite link may comprise at least a first satellite modem and a second satellite modem (not shown). The first satellite modem and the second satellite modem may be configured to communicate, at least with each other, via a satellite, for example, using appropriate transmission and reception means. The first satellite modem may be configured to be coupled to access point 1110 and may be referred to as a user-facing station. The second satellite modem may be configured to be coupled to core network device 1160 and may be referred to as a web-facing station (e.g., since core network device 1160, which may be coupled to the second satellite modem, may be configured to enable access to web servers, SIP servers, DNS servers, data centers, Intranet servers, and/or any other type of network or servers via Internet 1170).

Various aspects of the disclosure may be embodied as one or more methods, systems, apparatuses (e.g., components of a satellite communication network), and/or computer program products. Accordingly, those aspects may take the form of an entirely hardware embodiment, an entirely software embodiment, an entirely firmware embodiment, or an embodiment combining firmware, software, and/or hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In some embodiments, one or more computer readable media storing instructions may be used. The instructions, when executed, may cause one or more apparatuses to perform one or more acts described herein. The one or more computer readable media may comprise transitory and/or non-transitory media. In addition, various signals representing data or events as described herein may be transferred between a source and a destination in the form of electromagnetic waves traveling through signal-conducting media such as metal wires, optical fibers, and/or wireless transmission media (e.g., air and/or space).

Modifications may be made to the various embodiments described herein by those skilled in the art. For example, each of the elements of the aforementioned embodiments may be utilized alone or in combination or sub-combination with elements of the other embodiments. It will also be appreciated and understood that modifications may be made without departing from the true spirit and scope of the present disclosure. The description is thus to be regarded as illustrative instead of restrictive on the present disclosure.

What is claimed is:

1. A method for performing service discovery in a communication network, the method comprising:
   transmitting, by a first computing device and to a second computing device in the communication network, an encapsulated Internet Protocol (IP) packet, the encapsulated IP packet comprising an inner IP packet;
   analyzing, by the second computing device, a destination address of the inner IP packet of the encapsulated IP packet to determine whether the destination address of the inner IP packet is associated with a remote discovery server;
   modifying, by the second computing device and responsive to determining that the destination address of the inner IP packet is associated with a remote discovery server, the destination address of the inner IP packet to reference an IP address of a third computing device in the communication network;
   transmitting the encapsulated IP packet to a destination address indicated by the encapsulated IP packet;
   receiving, by the third computing device and from the Internet, the inner IP packet;
   modifying, by the third computing device, a source address of the inner IP packet to reference an IP address of the third computing device;
   modifying, by the third computing device, the destination address of the inner IP packet to reference an IP address of the remote discovery server;
   transmitting, by the third computing device, the inner IP packet to the remote discovery server;
   receiving, by the second computing device, a second encapsulated IP packet; and
   responsive to determining that a destination address of a second inner packet of the second encapsulated IP packet is not associated with the remote discovery server, transmitting, by the second computing device and without modifying the second encapsulated IP packet, the second encapsulated IP packet.

2. The method of claim 1, further comprising:
   generating, by the first computing device, the encapsulated IP packet.

3. The method of claim 1, wherein the encapsulated IP packet is transmitted from the second computing device to the third computing device via a gateway device, the method further comprising:
   analyzing, by the second computing device, a destination address of the second IP packet to determine whether the destination address of the second IP packet is associated with the remote discovery server.

4. The method of claim 1, further comprising:
   modifying, by the third computing device, a source port of the inner IP packet and maintaining a record of an original source port and an original IP source address of the encapsulated IP packet.

5. The method of claim 4, further comprising:
   receiving, by the third computing device, a fourth IP packet from the remote discovery server;
   analyzing, by the third computing device, a port value assigned to the fourth IP packet to determine a destination device for the fourth IP packet;
   modifying, by the third computing device, a destination address of the fourth IP packet to reference an IP address of the destination device; and
   transmitting, by the third computing device, the fourth IP packet to the destination device.

6. The method of claim 5, further comprising:
   receiving, by the third computing device, a fifth IP packet from the remote discovery server;
   analyzing, by the third computing device, a port value assigned to the fifth IP packet to determine a second destination device for the fifth IP packet;
   modifying, by the third computing device, a destination address of the fifth IP packet to reference an IP address of the second destination device; and
   transmitting, by the third computing device, the fifth IP packet to the second destination device.

7. The method of claim 6, further comprising:
   determining, by the remote discovery server, that the source address of the fourth IP packet is the same as the source address of the fifth IP packet;
   initiating, by the remote discovery server, a local discovery session between the destination device and the second destination device.

8. The method of claim 1, wherein the first computing device is an access point.

9. The method of claim 1, wherein the first computing device is an evolved node B (enodeB).

10. A system comprising:
    a first computing device configured to:
       transmit an encapsulated Internet Protocol (IP) packet to a second computing device, the encapsulated IP packet comprising an inner IP packet;
    the second computing device, wherein the second computing device is configured to:
       analyze a destination address of the inner IP packet to determine whether the destination address of the inner IP packet is associated with a remote discovery server;
       modify, responsive to determining that the destination address of the inner IP packet is associated with a remote discovery server, the destination address of the inner IP packet to reference an IP address of a third computing device;
       transmit the encapsulated IP packet to a destination address indicated by the encapsulated IP packet;
       receive a second encapsulated IP packet, the second encapsulated IP packet comprising a second inner IP packet;
       responsive to determining that a destination address of the second inner IP packet is not associated with the remote discovery server, transmit the second encapsulated IP packet without modifying the second encapsulated IP packet; and
    the third computing device, wherein the third computing device is configured to:
       receive the inner IP packet from the Internet;
       modify a source address of the inner IP packet to reference an IP address of the third computing device;
       modify the destination address of the inner IP packet to reference an IP address of the remote discovery server; and
       transmit the inner IP packet to the remote discovery server.

11. The system of claim 10, wherein the first computing device is configured to:
    receive a first IP packet; and encapsulate the first IP packet to generate the encapsulated IP packet.

12. The system of claim 10, wherein the encapsulated IP packet is transmitted from the second computing device to the third computing device via a gateway device, and wherein the second computing device is configured to:
    analyze a destination address of the second IP packet to determine whether the destination address of the second IP packet is associated with the remote discovery server.

13. The system of claim 10, wherein the third computing device is configure to:
    receive a third IP packet;
    responsive to determining that a destination address of the third IP packet is referencing the remote discovery server, modify a source address of the third IP packet to reference the IP address of the third computing device;
    encapsulate the third IP packet; and
    transmit the third IP packet to the remote discovery server.

14. The system of claim 13, wherein the third computing device is configured to:
    receive a fourth IP packet from the remote discovery server;
    analyze a port value assigned to the fourth IP packet to determine a destination device for the fourth IP packet;
    modify a destination address of the fourth IP packet to reference an IP address of the destination device; and
    transmit the fourth IP packet to the destination device.

15. The system of claim 14, wherein the third computing device is configured to:
    receive a fifth IP packet from the remote discovery server;
    analyze a port value assigned to the fifth IP packet to determine a second destination device for the fifth IP packet;
    modify a destination address of the fifth IP packet to reference an IP address of the second destination device; and
    transmit the fifth IP packet to the second destination device.

16. The system of claim 15, wherein the remote discovery server is configured to:
    determine that the source address of the fourth IP packet is the same as the source address of the fifth IP packet;
    initiate a local discovery session between the destination device and the second destination device.

17. The system of claim 10, wherein the first computing device is an access point.

18. The system of claim 10, wherein the first computing device is an evolved node B (enodeB).

* * * * *